United States Patent
Eckert

(10) Patent No.: US 10,529,106 B2
(45) Date of Patent: Jan. 7, 2020

(54) OPTIMIZING IMAGE CROPPING

(71) Applicant: ADOBE INC., San Jose, CA (US)

(72) Inventor: Johannes Andreas Eckert, Seattle, WA (US)

(73) Assignee: ADOBE, INC., San Jose, CA (US)

( * ) Notice: Subject to any disclaimer, the term of this patent is extended or adjusted under 35 U.S.C. 154(b) by 115 days.

(21) Appl. No.: 15/948,552

(22) Filed: Apr. 9, 2018

(65) Prior Publication Data

US 2018/0225856 A1 Aug. 9, 2018

Related U.S. Application Data

(63) Continuation of application No. 15/052,702, filed on Feb. 24, 2016, now Pat. No. 9,972,111.

(51) Int. Cl.
| | |
|---|---|
| *G06T 11/60* | (2006.01) |
| *G06T 3/40* | (2006.01) |
| *G06T 7/11* | (2017.01) |

(52) U.S. Cl.
CPC .............. *G06T 11/60* (2013.01); *G06T 3/40* (2013.01); *G06T 7/11* (2017.01); *G06T 2207/20104* (2013.01); *G06T 2207/20132* (2013.01)

(58) Field of Classification Search
CPC ... G06T 3/40; G06T 11/60; G06T 7/11; G06T 2207/20104; G06T 2207/20132; H04N 21/234363; H04N 21/4621; H04N 21/440263
USPC .................................................. 382/173, 299
See application file for complete search history.

(56) References Cited

U.S. PATENT DOCUMENTS

| | | | |
|---|---|---|---|
| 6,882,755 B2 | 4/2005 | Silverstein et al. | |
| 7,054,496 B2 | 5/2006 | Miceli et al. | |
| 8,432,492 B2 | 4/2013 | Deigmoeller et al. | |
| 9,165,203 B2 | 10/2015 | McCarthy | |
| 9,329,827 B2 | 5/2016 | Lavine et al. | |
| 2004/0075671 A1 | 4/2004 | Vale et al. | |
| 2008/0075388 A1 | 3/2008 | Nishijima | |
| 2012/0134595 A1 | 5/2012 | Fonseca et al. | |

(Continued)

FOREIGN PATENT DOCUMENTS

| | | |
|---|---|---|
| AU | 2016277725 A1 | 9/2017 |
| CN | 107123084 A | 9/2017 |

(Continued)

OTHER PUBLICATIONS

Search Report Under Section 17 dated Jun. 23, 2017 in UK Patent Application No. 16220345, 4 pages.
(Continued)

*Primary Examiner* — Daniel G Mariam
(74) *Attorney, Agent, or Firm* — Shook, Hardy & Bacon, L.L.P.

(57) ABSTRACT

Embodiments of the present invention are directed to optimizing image cropping. In accordance with some embodiments of the present invention, an image and an indication of an area of interest within the image are obtained. Thereafter, an amount to scale the image is determined based on a size of a container into which the image is to be placed for display. The amount to scale the image is greater for containers of a smaller size to focus on the area of interest within the image than the amount to scale the image for containers of a larger size. The image can be scaled in accordance with the determined amount to scale the image, and thereafter cropped to fit within the boundaries of the container.

20 Claims, 7 Drawing Sheets

(56) References Cited

U.S. PATENT DOCUMENTS

2014/0321770 A1  10/2014  Potdar
2015/0085114 A1   3/2015  Ptitsyn
2015/0310585 A1  10/2015  Gupta et al.

FOREIGN PATENT DOCUMENTS

DE    102016015156 A1   8/2017
GB         2547757 A    8/2017

OTHER PUBLICATIONS

Notice of Allowance dated Jan. 9, 2018 in U.S. Appl. No. 15/052,702, 8 pages.
Non-Final Office Action dated Jun. 13, 2017 in U.S. Appl. No. 15/052,702, 13 pages.
Final Office Acton dated Nov. 9, 2017 in U.S. Appl. No. 15/052,702, 14 pages.

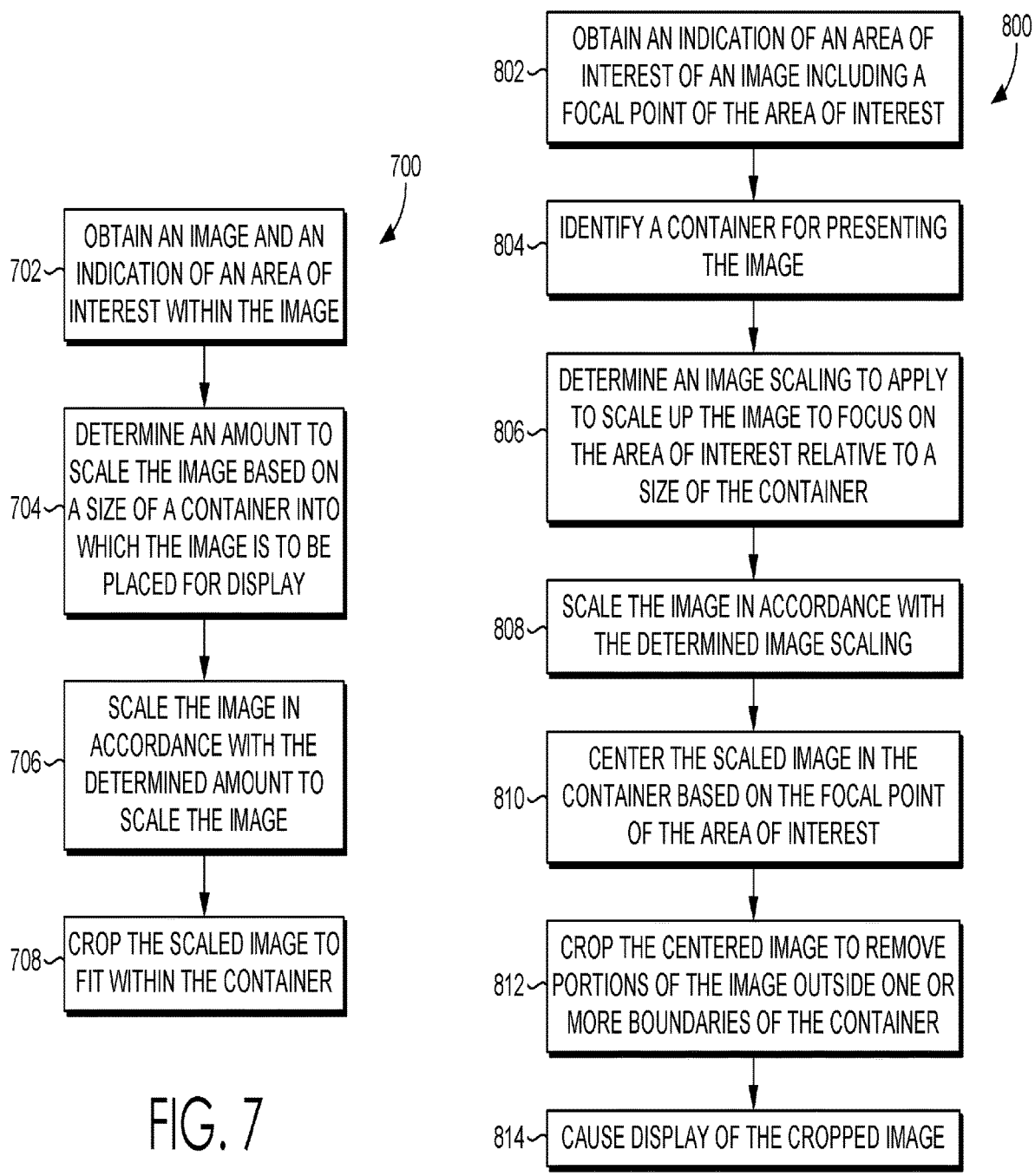

OPTIMIZING IMAGE CROPPING

CROSS-REFERENCE TO RELATED APPLICATIONS

This application is a continuation of and claims priority from U.S. application Ser. No. 15/052,702, filed Feb. 24, 2016, entitled "Optimizing Image Cropping," which is assigned or under obligation of assignment to the same entity as this application, the entire contents of each application being herein incorporated by reference.

BACKGROUND

When displaying an image within a responsive layout associated with a web or mobile application, the image may be placed within a container of nearly any shape and size. For example, an image may be placed within a container of one size at a first instance, while the same image is placed within a container of a second size at a second instance. The container size for image placement may vary for any number of reasons, such as, prominence of the image at the time of the display (e.g., association with a relevant search result), size of the device or display screen (e.g., larger device may result in a larger container size), or the like.

To facilitate cropping of an image for a container, some conventional techniques ensure placement of a single focal point within the boundaries of the container. Other techniques perform auto detection of a face and place the face within the boundaries of the container. With either technique, the image is simply sized to fit the container such that the image has an appropriate width and/or height that corresponds with the container. The excess image not within the boundaries of the container can then be cropped. This approach, however, can result in a meaningless display of the image, particularly due to the varying container sizes in which an image may be placed. For example, assume that an object of interest in an image is an individual, but the individual is only a small portion of the image. Using such conventional approaches, irrespective of the size of the container, the image is sized to fit the container (e.g., height of the container). As such, when the image is placed in a relatively small container, the individual is likely very difficult to see within the image amidst the details and content surrounding the individual.

SUMMARY

Aspects of the present disclosure relate to optimizing image cropping in accordance with container size. In this regard, prior to cropping an image, the image is scaled to fit a particular container into which the image is to be placed within a layout based on the size of the container. To this end, an image placed in a relatively large container might be minimally scaled, or not scaled at all, while an image placed in a relatively small container might be considerably scaled to focus on a particular area of interest (hotspot). Scaling an image based on container size can enable the particular area of interest to remain in view in a clear and legible manner. For example, assume that an area of interest is a person's face. In such a case, when the image is presented within a relatively small container, the person's face can occupy a substantial portion of the container. As such, content surrounding the area of interest (the person's face) can be generally excluded from being displayed to remove any unnecessary distraction from the person's face.

In addition to optimally scaling the image in accordance with the size of container into which the image is to be placed for display, in some implementations, the image can be positioned within the container such that the area of interest, or hotspot, is positioned within the boundaries of the container. For instance, a designated hotspot can be centered within the container to ensure full visibility of the area of interest. Upon determining scaling and placement of the image within the container, the image can be cropped to remove the portions of the image that fall outside the boundaries of the container. The optimally cropped image can then be displayed in a manner that allows optimal viewing of the area of interest.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is a flow diagram showing a method of facilitating image cropping optimization in accordance with embodiments of the present disclosure;

FIG. 8 is a flow diagram showing another method of facilitating image cropping optimization in accordance with embodiments of the present disclosure;

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A single image can be displayed on user devices in any number of sizes. For example, a mobile device might display an image in a smaller size than a tablet displaying the image. As another example, an image may be displayed in association with a prominent article at one instance resulting in a larger image size, while the image is displayed with less prominence a week later as the article may no longer be considered breaking news resulting in a smaller image size. In particular, responsive designs used in connection with websites or applications typically include containers of various shapes and sizes. The containers are generally adapted to the viewing environment (e.g., size of display screen) to provide an optimal view and interactive experience. As a result, a mobile device displaying a website might provide an image in a smaller sized container relative to the same image within the website being displayed on a laptop device.

Figure 1:
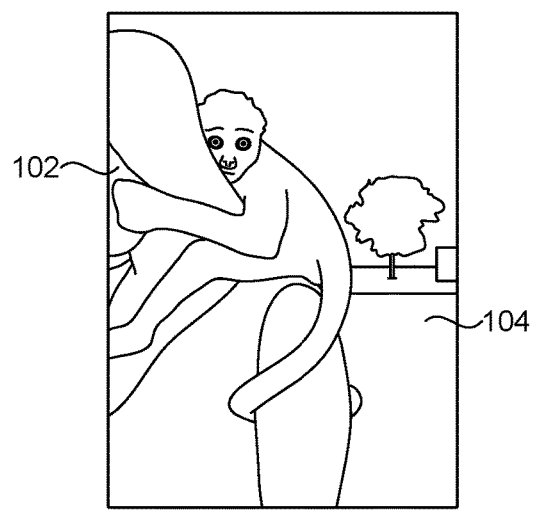
FIG. 1 shows an exemplary image that has been cropped resulting in removal of an area of interest.

Because of variable container sizes in which an image might be presented via a user device, the image is frequently cropped in order to fit the appropriate container in which it will be presented. To automate image cropping so that the image fits within a particular container, conventional systems center the image within the container, size the image to fit the container (e.g., the height of the container), and then crop the portion of the image that exists outside the boundary of the container. Such automated cropping, however, can result in undesired images being presented, particularly if an object of interest in the image is cropped completely or partially from the image. For instance, cropping an image such that a portion of an individual's face is cropped is likely an undesired modification to the image. By way of example, and with brief reference to FIG. 1, FIG. 1 illustrates an example in which a portion of an object of interest 102 (face) is cropped from the image 104.

Figure 2A:
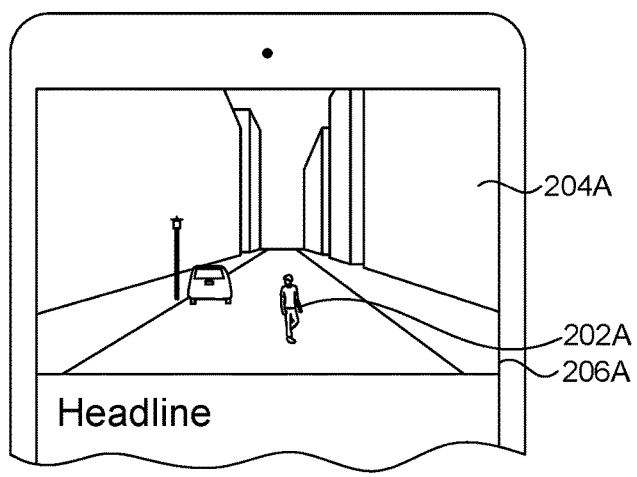
FIGS. 2A-2B illustrate an image being presented in association with different size containers.
Figure 2B:
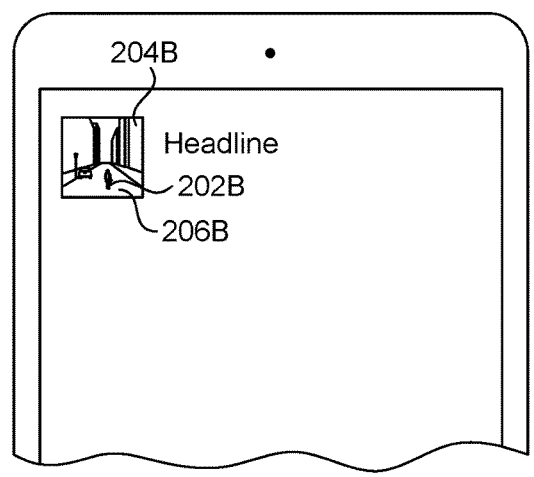

To avoid cropping a significant aspect in its entirety or partially from the image, some conventional systems have based cropping techniques on a single location designated by a publisher. In this regard, a publisher can select a single location in an image, which is then excluded from being cropped when displayed on a user device. While maintaining a single location within the cropping boundaries of an image, the image is simply sized to fit the boundaries of the container (e.g., size the image such that the top border and bottom border of the image fit in connection with the container). Image sizing in this manner can result in an image being displayed within an undesirable level of detail or a level of detail in the image that is not meaningful to the viewer of the image. In this regard, the details or content contained within the cropped image are not optimized relative to the size and/or shape of the container in which the image is being placed. As such, an object of interest within an image may be undesirably reduced in size when the image is fit for a small container. By way of example only, and with reference to FIGS. 2A and 2B, assume the user 202A is an object of interest in image 204A. When the image is scaled to fit within container 206A, the object 202A remains a significant and viewable aspect of the image. However, when the image 204B is scaled to fit within container 206B, the user 202B becomes a small aspect surrounded by details or content that overshadow the object of interest, user 202A.

Accordingly, embodiments of the present invention are directed to optimal image cropping. In this regard, images can be effectively or optimally cropped to fit within containers, for instance, within a responsive layout design. A responsive layout design refers to a layout (e.g., within a website or application environment) with one or more containers that generally adapt to the viewing environment to provide an optimal view and/or interactive experience. As a result, a mobile device displaying a website might provide an image in a smaller sized container relative to the same image within the website being displayed on a laptop device. A container refers to a container that can hold (or is a placeholder for) any type of data or a particular type of data. In some cases, a container includes attributes that define a type of data to hold within the container. For example, a container can be designated to hold an image.

In accordance with aspects of the invention described herein, an image can be optimally cropped to fit different size containers. For optimal cropping, an image is scaled in accordance with the size of the container to which the image is to be placed. Scaling an image based on the container size can result in a more meaningful image being presented to a user via a user device. For instance, an image being presented within a smaller container can be considerably scaled to focus on a particular area of interest (hotspot). By focusing on the hotspot, the image will likely be more meaningful and clear to the user as the full content outside or external to the hotspot is not distracting from the content indicated as meaningful (hotspot). For example, in instances that numerous images are processed and displayed, such as in a search results page, reducing the level of detail to focus on an area of interest of the image can assist the user viewing the numerous images. As another example, in instances where an image appears in a smaller size (e.g., if the image is used as a placeholder during download), reducing the level of detail being displayed removes unnecessary distraction from an area of interest.

As mentioned, an image is scaled to fit a particular container into which the image is to be placed within a layout based on the size of the container. To this end, an image placed in a relatively large container might be minimally scaled, or not scaled at all, while an image placed in a relatively small container might be considerably scaled to focus on a particular area of interest (also referred to herein as a hotspot). In some cases, an amount of progression into the area of interest is used to determine an extent of image scaling to apply to an image. A progression amount, or hotspot progression amount, refers to a size or proportion of the hotspot relative to a container. The amount of progression can be determined based on the size of the container into which the image is to be placed as compared to a maximum container size and a minimum container size associated with the display device. For example, a container size that is approximately half-way between a maximum and minimum container size might result in a hotspot progression of 0.5 (on a scale of 0 to 1). The hotspot progression amount can then be used to determine a level or extent of scaling that, when applied, results in a scaling of the image such that the image hotspot occupies the desired portion (e.g., 50%) of the container.

In addition to optimally scaling the image in accordance with the size of container into which the image is to be placed for display, in some implementations, the image can be positioned within the container such that the area of interest, or hotspot, is positioned within the boundaries of the container. For instance, a designated hotspot can be centered within the container to ensure full visibility of the area of interest. Upon determining scaling and placement of the image within the container, the image can be cropped to remove the portions of the image that fall outside the boundaries of the container. The optimally cropped image can then be displayed in a manner that allows optimal viewing of the area of interest, or hotspot.

Figure 3A:
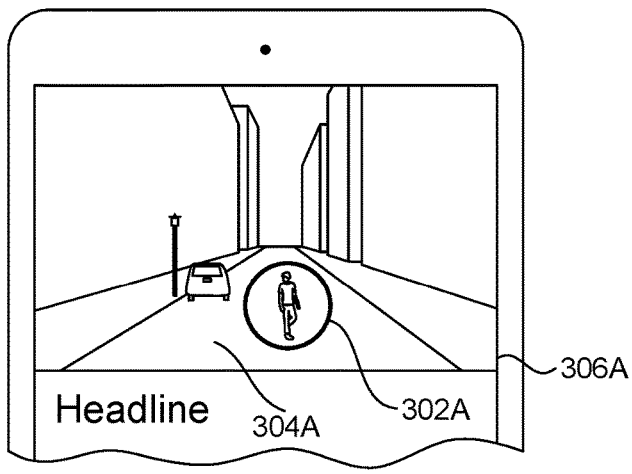
FIGS. 3A-3B illustrate an image with different scaling factors being presented in association with different size containers, in accordance with embodiments of the present disclosure.
Figure 3B:
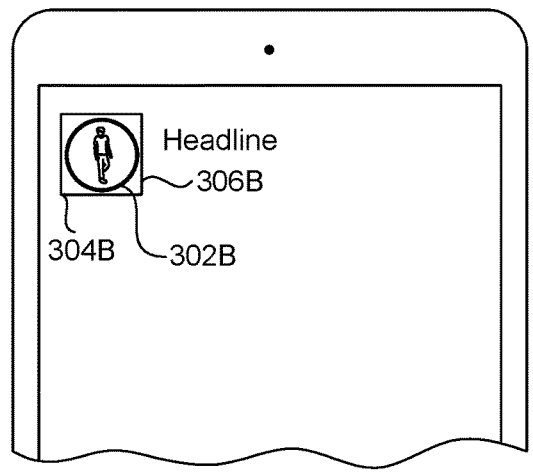

By way of example and with reference to FIGS. 3A and 3B, assume that a hotspot 302A of FIG. 3A is designated as an area of interest within image 304A. Further assume that image 304A is to be presented within container 306A. Because the container 306A is relatively large, the image 304A is minimally scaled. Now assume that hotspot 302B of FIG. 3B is designated as an area of interest within image 304B and that image 304B is to be presented within container 306B. Because the container 306B is relatively small, the image 304A is considerably scaled to focus on the hotspot 302B. As such, based on the size of the container, the image is appropriately scaled to focus on the hotspot within the image.

Although aspects of the present invention are generally described herein in relation to containers within responsive layout designs, as can be appreciate, this technology can be implemented in other image cropping environments. The above concepts and others, including variations and combinations thereof, are contemplated as being within the scope of the present disclosure.

Figure 4:
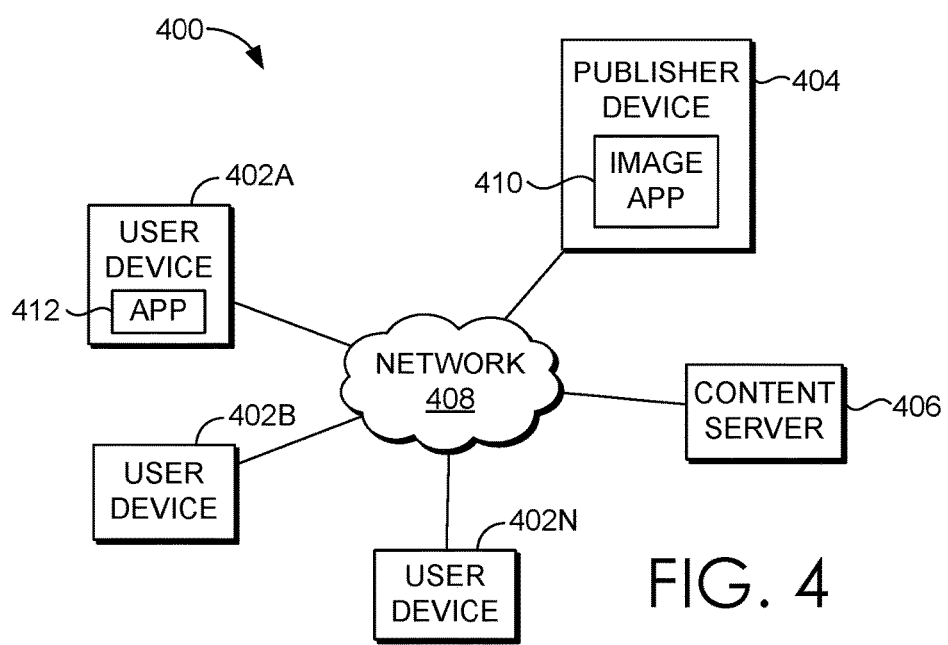
FIG. 4 is a block diagram of an exemplary system for optimizing image cropping, in accordance with embodiments of the present disclosure.

Turning now to FIG. 4, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 400 includes a number of user devices, such as user devices 402a and 402b through 402n, a publisher device 404, a content server 406, and a network 408. It should be understood that operating environment 400 shown in FIG. 4 is an example of one suitable operating environment. Each of the components shown in FIG. 4 may be implemented via any type of computing device, such as one or more of computing device 1000, described in connection to FIG. 10, for example. These components may communicate with each other via network 408, which may be wired, wireless, or both. Network 408 can include multiple networks, or a network of networks, but is shown in simple form so as not to obscure aspects of the present disclosure. By way of example, network 408 can include one or more wide area networks (WANs), one or more local area networks (LANs), one or more public networks, such as the Internet, and/or one or more private networks. Where network 408 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 408 is not described in significant detail.

It should be understood that any number of user devices, publisher devices, and content servers, may be employed within operating environment 400 within the scope of the present disclosure. Each may comprise a single device or multiple devices cooperating in a distributed environment. For instance, content server 406 may be provided via multiple devices arranged in a distributed environment that collectively provide the functionality described herein. Additionally, other components not shown may also be included within the distributed environment.

At a high level, a publisher associated with a publisher device 404 can designate enriched data for a particular image that enables or facilitates optimal cropping of the image. For instance, and as described in more detail below, the publisher can designate a hotspot, or region of interest, within the image so that the image is appropriately scaled and cropped in accordance with the hotspot. Upon generating the enriched image, that is the image including the enriched metadata, the enriched image can be provided to the content server 406. The content server 406 generally manages serving or providing images, for example, in association with a website or an application (e.g., a mobile application). When a user device 402 provides a request for content, the content server 406 can provide an enriched image(s), among other things, to the user device 402 for display. Using the enriched data associated with the image, the user device can display the image (e.g., within a container) in a manner that optimizes the scaling and cropping of the image.

Turning initially to the publisher device 404, the publisher device 404 can be any type of computing device capable of being operated by a publisher. A publisher is used herein to refer to an individual or entity that indicates enriched data for an image(s). In some cases, a publisher device can be used by an entity publishing an image for incorporation into content. For instance, an image and enriched image data is provided to a content server to serve content, such as applications or websites provided by a third-party. In other cases, a publisher device can be used by an entity that publishes its own application or website having one or more images.

Figure 10:
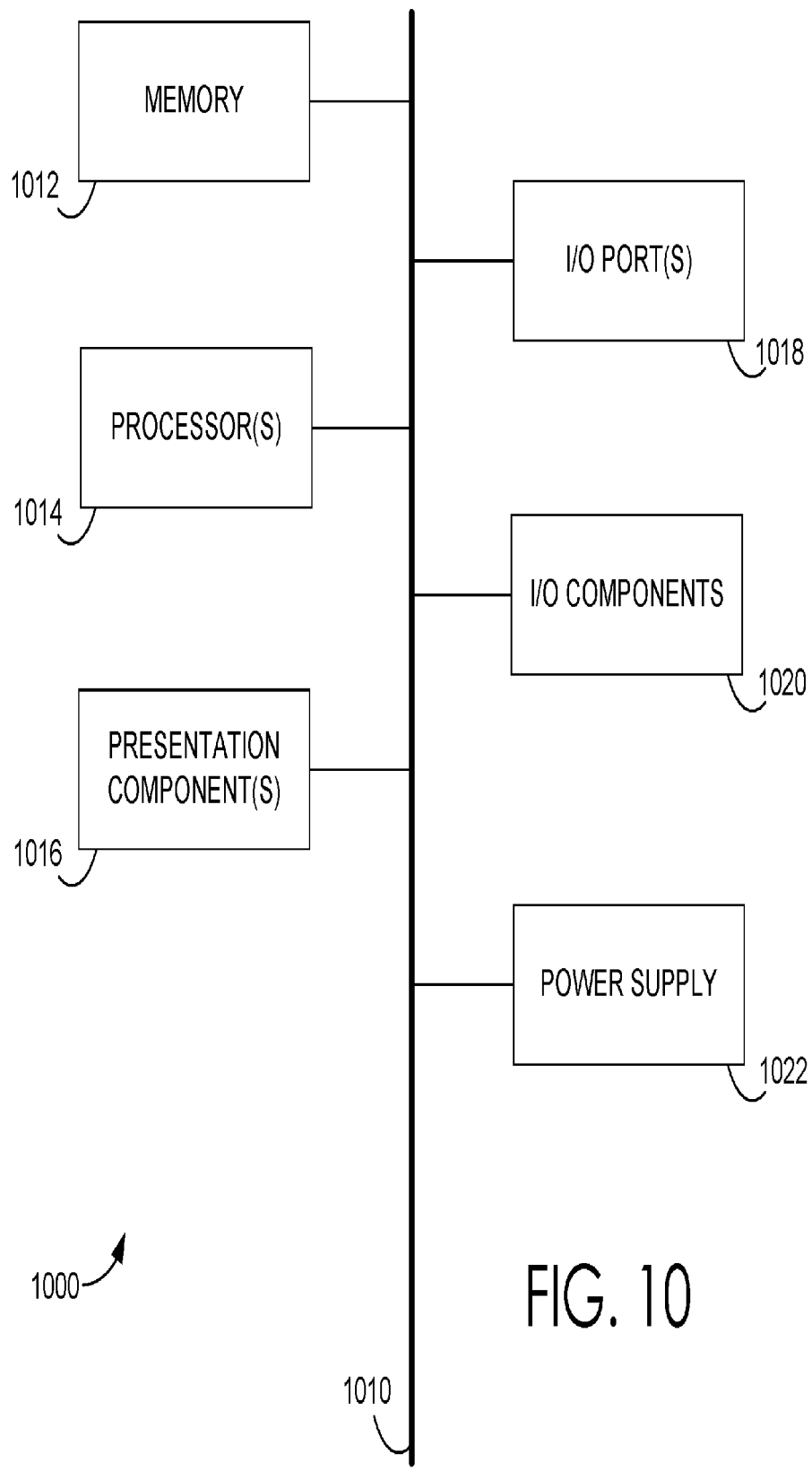
FIG. 10 is a block diagram of an exemplary computing environment suitable for use in implementations of the present disclosure.

In some implementations, publisher device 404 is a type of computing device described in relation to FIG. 10 herein. By way of example and not limitation, a publisher device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The publisher device can include one or more processors, and one or more computer-readable media. The computer-readable media may include computer-readable instructions executable by the one or more processors. The instructions may be embodied by one or more applications, such as image application 410 shown in FIG. 4. The image application 410 may generally be any application capable of facilitating provision of an enriched image between the publisher device 404 and the content server 406. Although generally described herein as communicating with content server 406, as can be appreciated, the publisher device 404 can communicate directly with the user device 402 and/or other components (e.g., servers or devices) not shown. In some implementations, the image application(s) 410 comprises a web application, which can run in a web browser, and could be hosted at least partially server-side. In addition, or instead, the image application(s) can comprise a dedicated application. In some cases, the application is integrated into the operating system (e.g., as a service).

A publisher can provide input to content server 406 using image application 410. The input may be provided by the user via a user interface of application 410, which can be client or server based (e.g., browser based). Generally, a publisher can select or input enriched image data in association with an image. Enriched image data is generally referred to herein as data or metadata that indicates an attribute(s) associated with an image that enables or facilitates cropping and/or scaling of the image. Enriched image data can be used by a displaying or presenting device to place the image within a container. As described herein, enriched image data may include indicating a hotspot. A hotspot refers to a region or area of interest within an image. A hotspot can be selected or designated in any number of ways.

Figure 5:
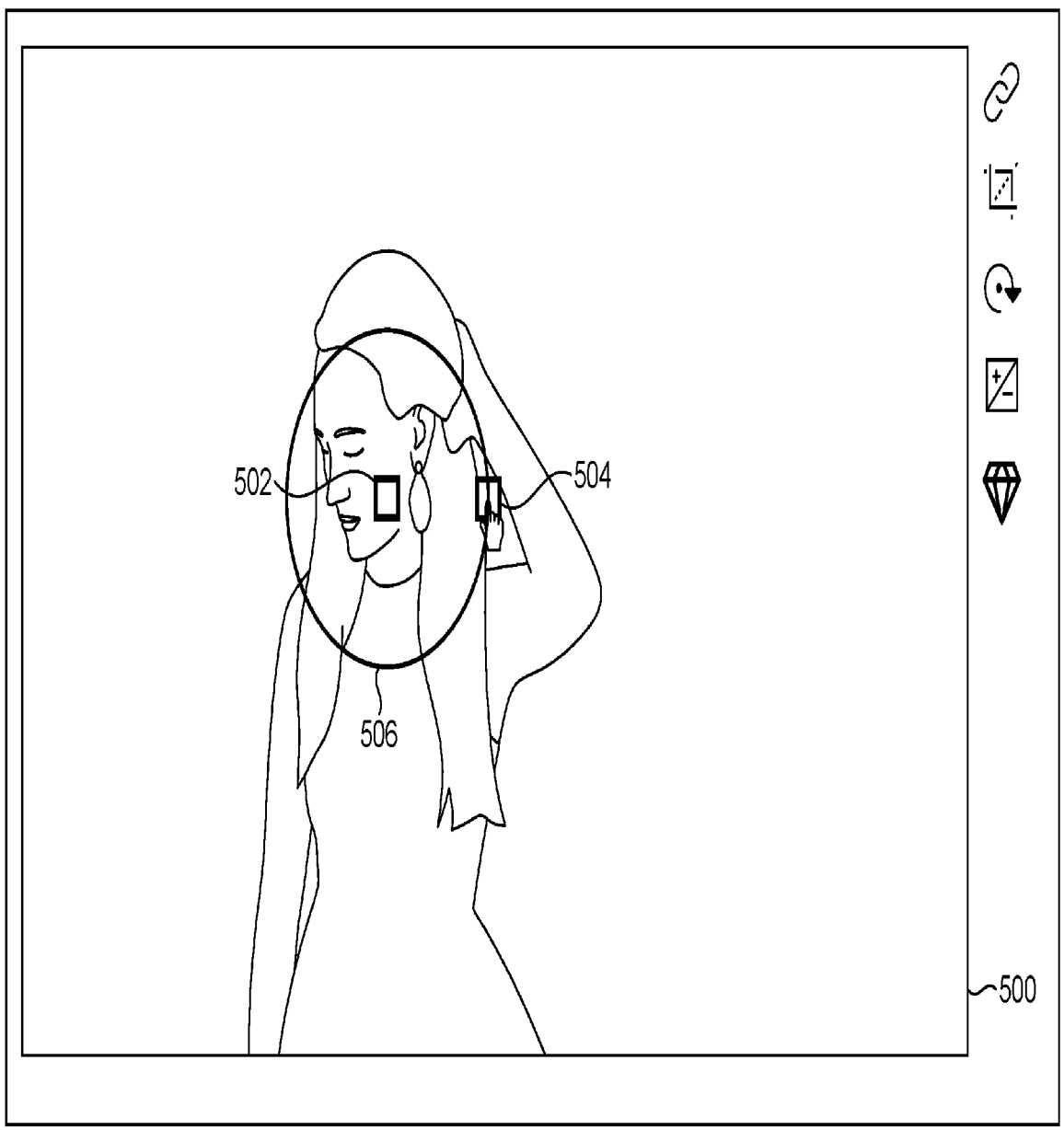
FIG. 5 illustrates an exemplary user interface for selecting a focal point and hotspot, in accordance with embodiments of the present disclosure.

In one embodiment, a hotspot can be designated based on a user selection of a focal point and an area. A focal point may be any point or location within an image (e.g., designated by a pixel), such as a single x, y position on the image indicating the center of the hotspot. A hotspot area can be indicated in any manner to designate a size or area of the hotspot. For example, a hotspot size can be designated as the radius from the focal point. In such a case, a hotspot refers to an area of interest with a designated radius around the focal point. In some implementations, a one-click interface allowing the publisher to set up the hotspot center and size with one click and drag gesture can be employed. With reference to FIG. 5, FIG. 5 illustrates one exemplary user interface for selecting a hotspot via a focal point and radius. As shown in FIG. 5, a publisher can select a focal point 502 within image 500 and select a radius 504 to generate the hotspot 506. As can be appreciated, a hotspot can be designated in any number of manners. For instance, such selections can occur as two distinct selections, click for the focal point and drag for the radius, etc. Further, although described as a circular hotspot based on a radius, as can be appreciated, any shape can be used to designate a hotspot. For instance, a user may draw a free form shape around an object of interest. As described in more detail below, when the image is displayed, the focal point can be used to determine the point of the image that is to be retained during cropping, and the hotspot area can be used to determine the scale of the image.

Returning to FIG. 4, the content server 406 refers to a server that serves content to user devices. A content server may be associated with a search engine, a website, or an application to provide webpages or application pages for display on the user device 402. The enriched images received from publisher devices, such as publisher device 404, can be stored such that they are accessible by the content server 406. In one implementation, the enriched images can be stored as part of the XMP standard. For instance, the XMP metadata may be stored inside the image file itself or in a sidecar image (filename xmp) along with the image. When a request for content is received from a user device, the content server 406 can provide content to the user device. As described, the content server 406 generally provides the enriched image having the enriched image data such that the user device can modify the image based on the enriched data. As can be appreciated, the content server 406 may deliver the enriched image either with the metadata embedded or as a sidecar file to a device, application, or service requesting the image. To this end, the image may be transferred over the network to a third party displaying the image on a user device but that is not affiliated with the publisher (e.g., the image could be uploaded to a wordpress site of another blog). As such, the metadata can be available to any entity desiring to use or store the data.

User devices 402a through 402n can be client devices on a client-side of operating environment 400, while content server 406 can be on a server-side of operating environment 400. Content server 406 can comprise server-side software designed to work in conjunction with client-side software on user devices 402a through 402n so as to implement any combination of the features and functionalities discussed in the present disclosure. An example of such client-side software is application 412 on user device 402a. Each other device includes a similar application, with similar functionality. This division of operating environment 400 is provided to illustrate one example of a suitable environment, and it is noted there is no requirement for each implementation that any combination of content system 406 and user devices 402a through 402n to remain as separate entities.

User devices 402a through 402n can be any type of computing device capable of being operated by a user. For example, in some implementations, user devices 402a through 402n are the type of computing devices described in relation to FIG. 10 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 412 shown in FIG. 4. As indicated above, the other user devices can include one or more applications similar to application 412. The application(s) may generally be any application capable of facilitating the exchange of information between the user device and the content server. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

A user can provide input to content server 406 using application 412. The input may be provided by the user via a user interface associated with application 412, which can be client or server based (e.g., browser based). Typically, a user initiates a request for content, for example, from a content server 406. For example, a user might initiate a request for a webpage, website, or application. Such a webpage, website, or application may be a responsive in that images are placed in containers within the website or application. A request may be initiated via user input into an application or web browser (e.g., input a URL, or selection of a link).

In response to the request for content, content can be received, for example, from content server 406. As described, the content can be in the form of a webpage or application containing one or more containers for placement of an image(s). The content provided to user device 402 can also include the enriched images including the images and enriched image data.

The application 412 can utilize the received enriched image data to manipulate or modify the image for inclusion in a particular container within an application layout (e.g., a responsive layout). Stated differently, the application 412 utilizes the received enriched image data to determine an optimal or appropriate presentation of an image(s) within a container.

In accordance with embodiments of the present invention, to optimize an image for placement within a particular container, the image can be scaled and/or cropped relative to the size and/or shape of the container into which the image is to be placed. For example, with responsive designs for web and mobile applications, images may potentially be displayed in any number of shapes and/or sizes of containers. As such, scaling and/or cropping of an image can be determined during display time to optimally fit the image into the responsive layout.

Scaling generally refers to resizing an image. Any number of techniques can be used to scale an image. For example, scaling may apply a nearest neighbor interpolation, where each pixel is simply replaced by four pixels of the same size. As another example, scaling can be used to perform zooming in or zooming out operations on images. As yet another example, a linear or bicubic scaling can be used to scaling to use. As can be appreciated, different resampling algorithms may be used to optimize the display based on the particular device and/or platform being used.

Scaling an image can be used to reduce a level of detail presented with the image displayed in a container. As such, scaling enables an image to be clear and legible at various sizes. For example, when an image is to be placed in a small container, the image can be scaled up to focus on an individual's face indicated as a hotspot, that is, area of interest. In some cases, to scale up, new pixels might be created. In other cases, the source image may include information to scale up without interpolation. As another example, in instances that a large number of images are processed and displayed, such as within a search results (e.g., of a news application), reducing the level of detail presented within the images enables a focus on an important or valuable portion of an image to assist the user to process the list of images.

As described herein, image scaling for an image is determined in accordance with a size of a container into which an image is to be placed. Image scaling can be determined relative to or proportional to the size of the container into which the image is to be placed (sometimes referred to herein as a destination container). In this regard, an image may be scaled at a greater extent when the destination container is a smaller size than if the destination container is a larger size.

Any number of methods may be employed to determine an amount or extent to scale an image relative to a destination container. In one embodiment, an image scale to apply to an image is determined based on a level of scaling required to result in a hotspot being presented at a particular size relative to the destination container. By way of example only, and without limitation, assume that a hotspot is to be presented in its original size relative to the destination container. In such a case, the image scaling to apply to the image is 0. Now assume that a hotspot is to be presented to occupy most of the destination container (e.g., maximum width and/or height). In this case, the image scaling to apply to the image can be determined based on the amount of scaling needed for the hotspot to occupy nearly all of the destination container (e.g., align the hotspot height or width with the boundaries of the container).

To determine an image scaling that is appropriate or proportional for a destination container, a hotspot progression amount can be determined. A hotspot progression amount refers to a size or proportion of the hotspot relative to a destination container. As can be appreciated, a hotspot progression can fall within any range of progressions. For instance, as described herein, a hotspot progression may be between 0 and 1. A hotspot progression amount of 0 indicates a size or proportion of the hotspot does not change. A hotspot progression amount of 1 indicates a size or proportion of the hotspot is to be modified such that the image hotspot occupies nearly all of the container. For example, a width and/or height of the hotspot may align with the boundary of the container.

To determine an amount of hotspot progression, a destination container size, a maximum container size, and a minimum container size can be identified. A destination container size refers to a size of a container in which an image is to be placed or presented. As can be appreciated, an image can be designated for placement in a particular container in any number of ways. For instance, metadata associated with an image and/or container may be used to identify which container an image is to be placed. The application can then identify the size of the container into which the application is to be placed. In some cases, the container size can be determined based on screen resolution of the device, orientation of the device, etc.

A maximum container size refers to a maximum or greatest potential size of a container into which the image could be placed or presented. A maximum container size can be based on the size of the display device or display screen (e.g., mobile device, tablet, etc.), the size of a web browser being displayed, etc. A minimum container size refers to a minimum or smallest potential size of a container into which the image could be placed or presented. As can be appreciated, a minimum container size could be as small as 1×1 pixel, but may be of any size that is deemed reasonable for displaying an image (e.g., 100 pixels×100 pixels). In some cases, a maximum and/or minimum container size may be a default container size that is applicable across devices. In other cases, a maximum and/or minimum container size may be a container size that is determined or designated for a particular display device, display screen size, web browser size, etc. In some cases, a maximum container size is associated with a hotspot progression amount of 0 such that scaling is not applied to the image, and a minimum container size is associated with a hotspot progression amount of 1 resulting in a complete scaling into the hotspot.

Based on the maximum container size, the minimum container size, and the destination container size, a hotspot progression amount for the destination container size can be determined. In one implementation, linear progression can be used to determine a hotspot progression amount for the destination container size. To this end, linear progression can be used to determine an amount of hotspot progression for a container size that falls between the maximum container size and the minimum container size. In some cases, only an aspect of the container, such as the width, may be considered.

Figure 6:
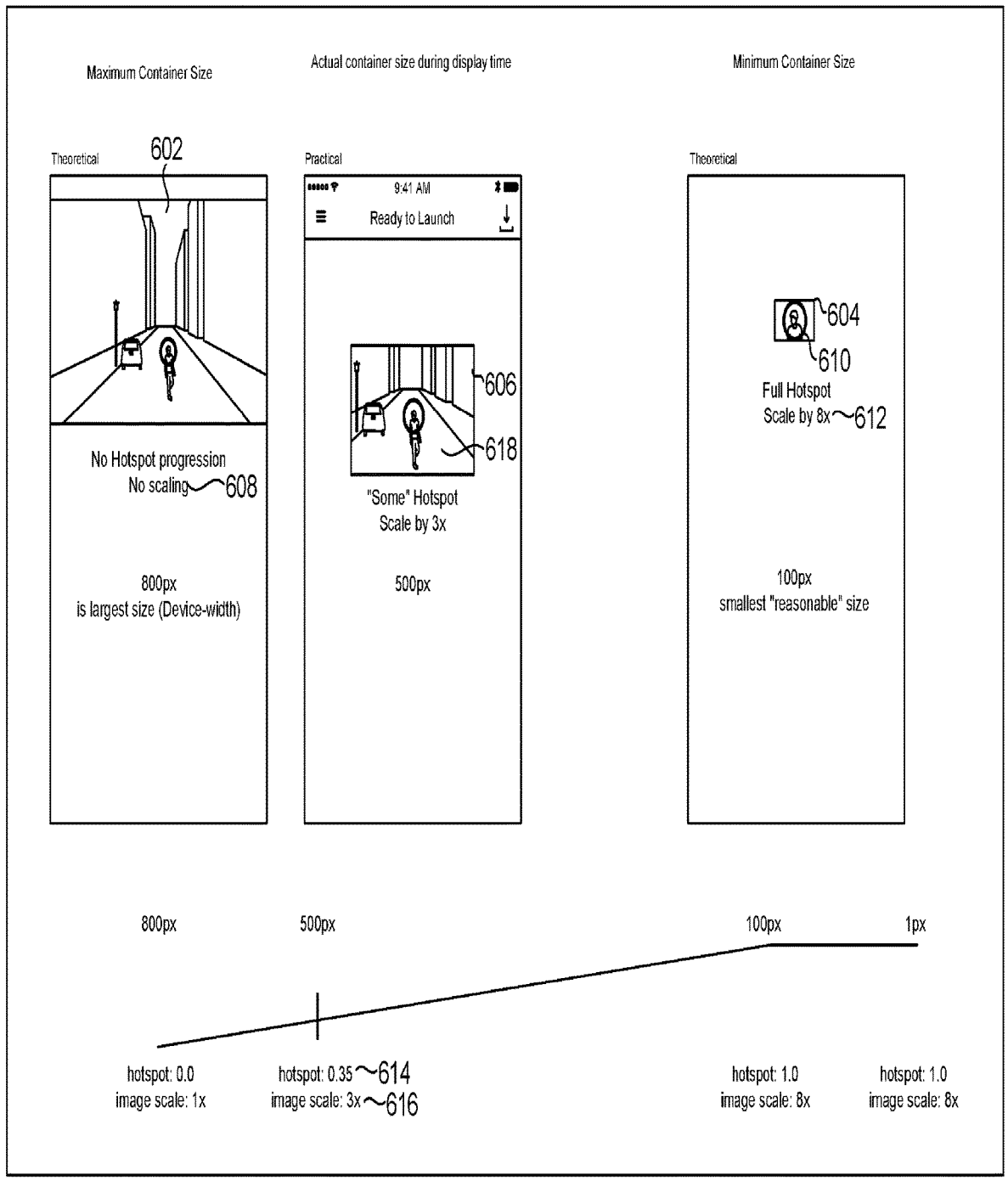
FIG. 6 illustrates an image being scaled and cropped in accordance with embodiments of the present invention.

By way of example only, and with reference to FIG. 6, assume that a maximum container size 602 is 800 pixels (in width) and has a hotspot progression amount of 0, and a minimum container size 604 is 100 pixels (in width) and has a hotspot progression amount of 1. Further assume that the destination container size 606 is 500 pixels (in width). To determine the hotspot progression amount of the destination container size 606, a linear progression model can be applied to determine an amount of progression to be 0.35. In this regard, it is desired to progress or scale into the hotspot such that 35% reflects the extent the hotspot effects the scaling.

The hotspot progression amount can then be used to determine an image scaling to apply to the image. In this regard, a determination can be made as to an extent of image scaling that is needed to result in a particular hotspot progression. In some implementations, the amount of image scaling to apply to an image is determined based on the size of the hotspot. To this end, if the hotspot is smaller, the image has to be scaled more to achieve a certain level of hotspot progression (e.g., 0.35) than would be needed to achieve the same level of hotspot progression if the hotspot is larger.

In some cases, to determine an image scaling for an image to be placed in a destination container, image scaling for the maximum container size and the minimum size container can be used. By way of example only, an image scaling for a maximum container size can be identified as an image scale of 100%, that is, the image is not scaled up to bring the hotspot in view. An image scaling for a minimum container size can be determined in a number of ways. In one implementation, the image scaling for a minimum container size can depend on the ratio of the hotspot size relative to the image size and also to the size/shape of the destination container. In particular, image scaling can be determined in accordance with scaling the image by an amount needed to have the hotspot fill the container width and/or height (or some other measure). As such, the hotspot area or size indicated in the enriched image data can be used to determine an amount of scaling to result in the hotspot occupying a large portion of the container. In some cases, for a minimum container size, the hotspot boundary(s) may be desired to align with the height and/or width of the container. By way of example only, and with reference to FIG. 6, the image scale 608 for the maximum container size can be designated as 100% or 1×. Further, for the hotspot 610 to fill the minimum container size 604, the image scale 612 can be determined to be 800% or 8×. As can be appreciated, the image scaling for the minimum size container varies depending on the size of the hotspot relative to the image. For instance, if the hotspot is smaller, the image will be scaled at a greater extent to bring the hotspot into full view.

The image scaling for the image in association with the destination container can then be determined using the image scaling identified for the maximum container size and/or the minimum container size. Determining image scaling for the destination container can be implemented in any number of ways. In one embodiment, the amount of image scaling to apply to an image for a destination container is based on the amount of progression determined for the destination container. In this regard, a hotspot progression for the destination container can be multiplied by the maximum image scale needed for the hotspot to fully occupy a container (e.g., linear progression). Stated differently, a hotspot progression determined for the destination container can be multiplied by the image scale determined for the minimum container size. By way of example, and with reference to FIG. 6, as shown, the progression amount 614 for destination container 606 is 0.35, and the image scaling 612 determined for the minimum container size 604 is 800% or 8× (e.g., the image is scaled up 8 times to bring the hotspot to approximately the same size as the container). As such, the image scaling for the destination container 606 can be determined to be 0.35 multiplied by 8× resulting in an image scaling 616 of approximately a factor of 3. An image scaling of 3× would be about 35% between the image scale of 1 for the maximum container size and the image scale of 8 for the minimum container size. That is, 35% of hotspot progression indicates 35% of 800% maximum scaling is applied to the image, which is approximately 280% (zoom up 2.8 times). In some cases, to determine the image scaling amount for the minimum container size, the image is initially scaled into a container disregarding hotspot progression, which will be considered 100% or 1×. Thereafter, using the minimum container size and size of the hotspot, a scale factor is determined to bring the hotspot to the same size as the container.

In addition to scaling an image, the application 412 can be configured to crop an image such that the image fits within the container. As such, after scaling an image, the image can be cropped to remove or exclude portions of the image that fall outside of the boundaries of the destination container. The location at which an image is cropped can be based how the scaled image is aligned with the container. As such, the focal point and/or hotspot designated in the enriched image data can be referenced to align the image. In some cases, the image is positioned within the container such that the designated focal point or hotspot is placed within the container. In other cases, the image is positioned within the container such that the designated focal point or hotspot is centered within the container. Based on placement of the image within the container, the image portions external to the container can be cropped.

Upon manipulating or adjusting an image for placement in a container, the application 412 can cause display of the image within the container. As such, the display screen of the user device 402 can display the image within a container at an optimized scaling and/or cropping. By way of example, and with reference to FIG. 6, the image 618 can be displayed in the container 606 at an appropriate or optimal scaling of the image to focus on the designated hotspot, while maintaining the hotspot at or near the center of the image.

Referring now to FIG. 7, a flow diagram is provided showing an embodiment of a method 700 for facilitating optimization of image cropping. Each block of method 700 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Initially, at block 702, an image and an indication of an area of interest within the image is obtained. Such information can be provided, for example, by a content provider in a response to a request for content. The indication of the area of interest may be designated or selected by a publisher, designer, or other provider of the image. For example, a publisher device (e.g., publisher device 404 of FIG. 4) can receive an input (e.g., touch input, keyboard input, etc.) related to an image or area of interest via an input component (e.g., display/I/O component 1020 of FIG. 10) of the publisher's device. The publisher device can then provide the input data related to the image and/or area of interest to the content provider, which can then provide the data to a user device (e.g., user device 402 of FIG. 4) in response to a request for content. At block 704, an amount to scale the image is determined based on a size of a container into which the image is to be placed for display. The amount to scale the image is greater for containers of a smaller size to focus on the area of interest within the image than the amount to scale the image for containers of a larger size. In this regard, an application at a user device, such as user device 402 of FIG. 4, can determine the amount to scale the image, particularly, containers of a smaller size can have a greater scaling amount. At block 706, the image is scaled in accordance with the determined amount to scale the image. At block 708, the scaled image is cropped to fit within the container. An application at a user device, such as user device 402 of FIG. 4, can scale and crop the image.

Referring now to FIG. 8, a flow diagram is provided showing one embodiment of a method 800 for facilitating optimization of image cropping. Initially, at block 802, an indication of an area of interest of an image including a focal point of the area of interest is obtained. Such information can be provided, for example, by a content provider in a response to a request for content. The indication of the area of interest may be designated or selected by a publisher, designer, or other provider of the image. For example, a publisher device (e.g., publisher device 404 of FIG. 4) can receive an input (e.g., touch input, keyboard input, etc.) related to an image or area of interest via an input component (e.g., display/I/O component 1020 of FIG. 10) of the publisher's device. The publisher device can then provide the input data related to the image and/or area of interest to the content provider, which can then provide the data to a user device (e.g., user device 402 of FIG. 4) in response to a request for content. At block 804, a container for presenting the image is identified. A container for presenting the image may be identified based on metadata associated with the image and/or resource (e.g., webpage or application). For instance, an application of a user device, such as user device 402 of FIG. 4, can identify the container in which the image is to be presented. At block 806, an image scaling to apply to scale up the image is determined to focus on the area of interest relative to a size of the container. At block 808, the image is scaled in accordance with the determined image scaling. At block 810, the scaled image is centered in the container based on the focal point of the area of interest. Subsequently, at block, 812, the centered image is cropped to remove portions of the image outside one or more boundaries of the container. At block 814, the cropped image is displayed. In embodiments, an application of a user device, such as user device 402 of FIG. 4, can determine an applicable image scaling, scale the image, center the image, crop the image, and display the image.

Figure 9:
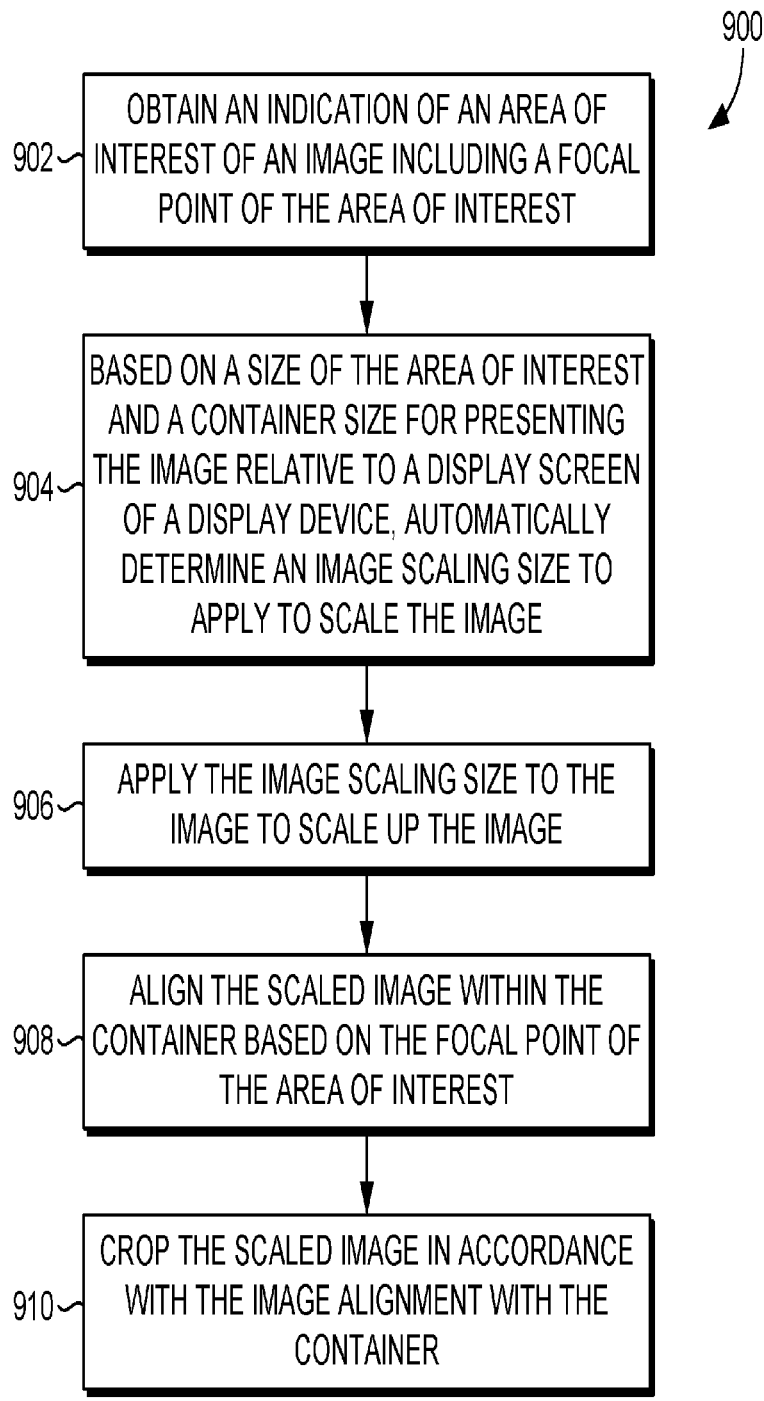
FIG. 9 is a flow diagram showing another method of facilitating image cropping optimization in accordance with embodiments of the present disclosure.

Referring now to FIG. 9, a flow diagram is provided showing one embodiment of a method 900 for facilitating optimization of image cropping. Initially, at block 902, an indication of an area of interest of an image including a focal point of the area of interest is obtained. For example, a publisher device (e.g., publisher device 404 of FIG. 4) can receive an input (e.g., touch input, keyboard input, etc.) related to an image or area of interest via an input component (e.g., display/I/O component 1020 of FIG. 10) of the publisher's device. The publisher device can then provide the input data related to the image and/or area of interest to the content provider, which can then provide the data to a user device (e.g., user device 402 of FIG. 4) in response to a request for content. At block 904, based on a size of the area of interest and a container size for presenting the image relative to a display screen of a display device, an image scaling size to apply to scale the image is automatically determined. In some cases, an image scaling size based on a progression amount determined for the area of interest with respect to the container size. At block 906, the image scaling size is applied to the image to scale up the image. At block 908, the scaled image is aligned within the container based on the focal point of the area of interest. At block, 910, the scaled image is cropped in accordance with the image alignment with the container. In embodiments, an application of a user device, such as user device 402 of FIG. 4, can determine an applicable image scaling, apply the image scaling size, align the scaled image, and crop the image.

Turning now to FIG. 10, FIG. 10 provides a diagram of an exemplary computing environment suitable for use in implementation of the present disclosure. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, implementations of the present disclosure provide for facilitating optimization of image cropping. The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for optimizing image cropping, the method comprising:
   receiving an image having a hotspot associated with a location of the image, the image having a first size, the hotspot having a second size;
   obtaining a container to display at least a portion of the image, the container having a third size;
   automatically determining an amount to scale the image based on the second size of the hotspot and the third size of the container, the amount negatively correlating to the second size of the hotspot;
   scaling the image in accordance with the amount;
   aligning the image with the container based on the location of the image; and
   cropping the image to fit within the container.

2. The method of claim 1, wherein the amount is simultaneously positively correlated to the third size of the container.

3. The method of claim 1, wherein the scaling comprises scaling the hotspot to a fourth size, wherein the fourth size of the hotspot is at a predetermined ratio of the second size of the container.

4. The method of claim 1, wherein the scaling comprises scaling the hotspot, and the aligning comprises aligning a boundary of the hotspot with a boundary of the container.

5. The method of claim 1, wherein the aligning comprises aligning the location of the image with a center of the container.

6. The method of claim 1, wherein the second size of the hotspot refers to at least two parameters of a shape of the hotspot.

7. The method of claim 1, wherein the third size of the container refers to only one aspect of a shape of the container.

8. The method of claim 1, wherein the hotspot has a circle shape, and the location of the image is a center of the hotspot.

9. The method of claim 1, wherein the location of the image associated with the hotspot is a focal point designated by a publisher of the image.

10. One or more non-transitory computer-readable media having a plurality of executable instructions embodied thereon, which, when executed by one or more processors, cause the one or more processors to perform a process comprising:
    obtaining an indication of a hotspot of an image including a focal point of the hotspot, the image having a first size, the hotspot having a second size;
    identifying a container to present the image, the container having a third size;
    determining an amount to scale the image based on the second size of the hotspot and the third size of the container, the amount negatively correlating to the second size of the hotspot;
    scaling the image in accordance with the amount;
    aligning the image with the container based on the focal point of the hotspot; and
    cropping the image to fit within the container.

11. The media of claim 10, wherein determining the amount comprises:
    identifying a first amount to scale the image associated with a maximum container size and a second amount to scale the image associated with a minimum container size; and
    determining the amount from the first amount and the second amount based on the third size of the container.

12. The media of claim 11, wherein the minimum container size and the maximum container size are both determined based on the second size of the hotspot.

13. The media of claim 11, wherein at least one of the minimum container size and the maximum container size is predetermined.

14. The media of claim 11, wherein at least one of the minimum container size and the maximum container size is determined based on a display type, a display size, or a browser size.

15. The media of claim 10, wherein the container is identified based on metadata associated with the image.

16. The media of claim 10, wherein the focal point is a pixel on the image.

17. A computer-implemented system, comprising:
    means for receiving an image having a hotspot associated with a location of the image;
    means for obtaining a container to display at least a portion of the image;

means for scaling the image in accordance with a scaling factor negatively correlated to a size of the hotspot; and means for cropping the image to fit within the container.

18. The computer-implemented system of claim 17, further comprising:

means for aligning the image with the container based on the location of the image.

19. The computer-implemented system of claim 17, wherein the scaling factor is further positively correlated to a size of the container.

20. The computer-implemented system of claim 17, wherein the location of the image has a two-dimensional coordination position on the image, and wherein the two-dimensional coordination position on the image is aligned with a center of the container.

* * * * *